Patented Mar. 21, 1939

2,151,022

UNITED STATES PATENT OFFICE 2,151,022

PROCESS FOR THE MANUFACTURE OF ALKALI METAL FLUORIDES AND HYDROXIDES

Fritz Gewecke, Westeregeln, Magdeburg, Germany, assignor, by mesne assignments, to Alkaliwerke Westeregeln G. m. b. H., Westeregeln, Germany, a corporation of Germany No Drawing. Application July 23, 1936, Serial No. 92,175. In Germany August 1, 1933

2 Claims. (Cl. 23—89)

This invention relates to a process for the production of caustic alkalies.

New processes for the manufacture of caustic alkalies are of considerable interest to the industry although a number of processes have been so well worked out after long practice that they are used for manufacture on a large scale.

Apart from the fact, however, that the methods of manufacture are frequently troublesome and the processes often suffer from the disadvantages that by-products for which use can only be found with difficulty are produced, processes which have advantages when small production units are concerned are also of considerable importance.

The process which is hereinafter described is based on a known combination of steps and it may be represented by the following series of equations:

1. $CaF_2 + H_2SO_4 = CaSO_4 + 2HF$.
2. $2HF + 2NaCl = 2NaF + 2HCl$.
3. $2NaF + Ca(OH)_2 = CaF_2 + 2NaOH$.

The Equation 2 in this scheme is an essential intermediate step between Equations 1 and 3. Although one would only expect equilibrium to be obtained it has been unexpectedly found that the decomposition can be caused to place quantitatively. To effect this, that is to say to effect the decomposition of hydrofluoric acid by means of alkali chloride in such a way that all the chlorine is driven off in the form of gaseous hydrochloric acid, according to the present invention, concentrated hydrofluoric acid containing more than 40% hydrogen fluoride is employed preferably in an excess depending on the concentration of the hydrofluoric acid.

It is known per se to convert solutions of common salt by means of hydrofluoric acid into sodium fluoride, in accordance with the Equation 2. The novel feature of the present invention is that the decomposition of the alkali chloride by the hydrofluoric acid is effected in the presence of an amount of water which is not sufficient to dissolve the alkali chloride, using concentrated hydrofluoric acid. By this means a considerable increase in yield is obtained as will be clear from the following comparative experiments. This, however, is not the only improvement effected, since it is also possible to obtain, by means of the process of the invention, alkali liquors which are free from chlorine. The comparative experiments mentioned above are as follows:

1. A saturated solution of rock salt containing 58.5 kg. NaCl and 165 kg. H₂O is treated with three times the equivalent amount of 40% hydrofluoric acid and heated, after the lapse of one hour a mixture of HCl and HF together with water vapour is evolved. The residue still contains 48.3% of the chlorine introduced.

2. The same amount of rock salt is introduced into only 25 kg. H₂O so that only a mash of the solid salt is formed and the same amount of hydrofluoric acid is added as in Experiment 1; a conversion of 73.2% is obtained when working under the same conditions as in Experiment 1.

3. The process is carried out under the same conditions as in Experiment 2 but 75% HF is employed instead of 40% hydrofluoric acid, the conversion amounts to 99.6%.

As compared with the known processes in which sodium fluoride is produced by thermal methods, the process according to the invention has the advantage that the sodium fluoride obtained has a greater reacting power. Moreover, in the entire process no furnace except the well-tried hydrofluoric acid furnace is necessary, so that the energy required for carrying out the process is very small and the installation costs are low.

Example 100 kg. of moist residue from the process which contain about 25 kg. H₂O and about 75 kg. CaF₂ are treated with the equivalent quantity of sulphuric acid of 1.84 sp. gr. and gradually heated in a cast iron vessel, while stirring, up to 250° C. The very reactive CaF₂ is thereby decomposed to form calcium sulphate while 32 kg. HF and about 24 kg. H₂O, i. e. a hydrofluoric acid of about 61% strength is distilled off. This is introduced, while stirring vigorously and cooling, into a receiver containing a thick suspension of 110 kg. NaCl, 30 kg. H₂O and 75 kg. HF. A mixture of HCl and HF together with water vapour escapes. This mixture is conducted through several similar absorption vessels where all the HF is bound or decomposed, while pure HCl gas leaves the process and is worked up in the usual manner to hydrochloric acid.

The contents of the receiver are now drawn off into a cast iron vessel and heated to 150 to 250° C. and a mixture of HF, HCl and H₂O escapes, which is conducted to the aforesaid absorption vessels for binding the HF, while a residue which is almost or completely free from chlorine remains behind.

If this residue is now treated with CaO or Ca(OH)₂ in aqueous solution then, after separation of the residual material, 70 to 75 kg. NaOH are obtained in solution in a concentration of 160 to 210 grams per litre while the residual material is returned to the process.

Obviously both the production of HF as well as the decomposition to the alkali chlorides can take place continuously, the mash of NaCl being preferably conducted in counter-flow to the HF gas.

It is of particular advantage to free the $CaF_2$ sludge which accumulates in the process from the greater part of its water so that only 0 to 20% $H_2O$ are still present, this being then decomposed with chamber acid of 60° Bé. In any case the total amount of water present in the process can be introduced either by the moisture in the $CaF_2$-sludge or by the acid, but on the one hand the amount of $H_2O$ necessary for the solution of the alkali chloride should not be present nor should a weaker acid than 40% be employed in order to avoid the yield being reduced.

I claim:

1. The process of producing alkali metal fluorides which comprises making a mash of an alkali metal chloride and water and subjecting this mash to the action of substantially three times the amount of concentrated hydrofluoric acid theoretically required for decomposing the chloride, the concentration of the hydrofluoric acid amounting to more than 40% HF, and the total quantity of water employed amounting to one half to twice the weight of the alkali metal chloride.

2. The process of producing alkali metal fluorides which comprises making a mash of an alkali metal chloride and water and subjecting this mash to the action of substantially twice the amount of concentrated hydrofluoric acid theoretically required for decomposing the chloride, the concentration of the hydrofluoric acid amounting to more than 40% HF, and the total quantity of water employed amounting to one half to twice the weight of the alkali metal chloride.

FRITZ GEWECKE.